United States Patent

[11] 3,614,416

[72] Inventor Jacques Fleury
 Paris, France
[21] Appl. No. 798,349
[22] Filed Feb. 11, 1969
[45] Patented Oct. 19, 1971
[73] Assignee Societe Anonyme Automobiles Citroen
 Paris, France
[32] Priority Feb. 16, 1968
[33] France
[31] 3,463

[54] ROAD VEHICLE LIGHTING EQUIPMENT
 14 Claims, 10 Drawing Figs.
[52] U.S. Cl. .................................................. 240/8.25,
 240/7.1 LJ, 240/62, 240/62.2
[51] Int. Cl. .................................................. B60q 1/12
[50] Field of Search .......................................... 240/62,
 62.1, 62.2, 62.3, 62.4, 62.5, 62.51, 8.25, 8.1, 8.1
 X, 7.1

[56] References Cited
 UNITED STATES PATENTS
 1,524,443  1/1925  McVey et al. .............  240/8.25
 2,557,590  6/1951  Beckerman et al. .......  240/62
 2,606,999  8/1952  Tostevin ....................  240/62
 3,370,162  2/1968  Henry-Biabaud ..........  240/7.1
 1,409,661  3/1922  Brown et al. ..............  240/62.2

Primary Examiner—Samuel S. Matthews
Assistant Examiner—Russell E. Adams, Jr.
Attorney—Arnold Robinson ABSTRACT: Road vehicle-lighting equipment includes a linkage for pivoting the headlamp in relation to the direction of travel of the vehicle and also means responsive to vehicle roll for changing the inclination of the pivot axis of the headlamps to turn the headlamps downwardly and inwardly of a curve to compensate for the roll action. In a modified form of structure means responsive to the speed of the vehicle are employed for changing the inclination of the pivot axis of the headlamps when the steering wheel is turned.

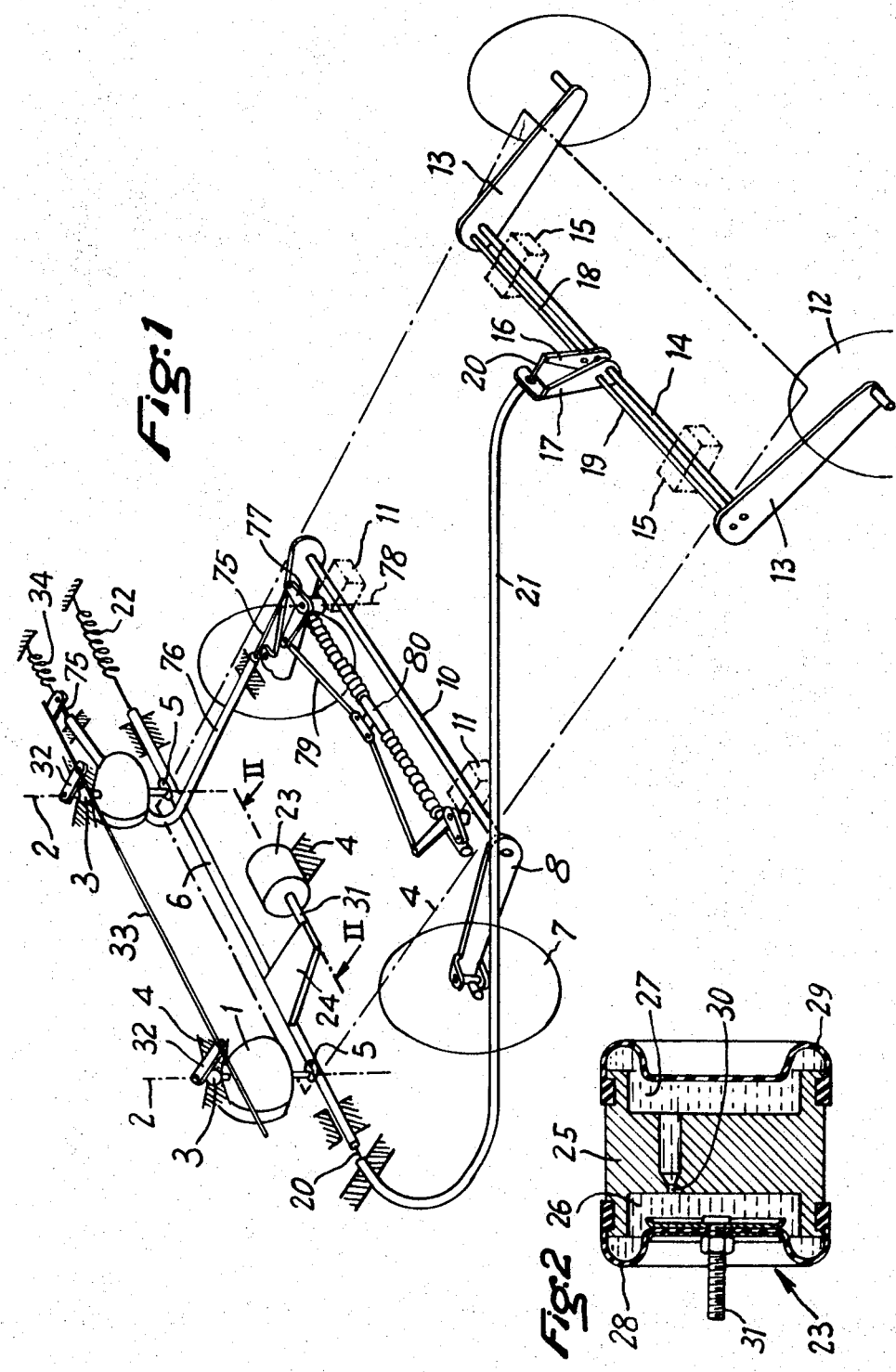

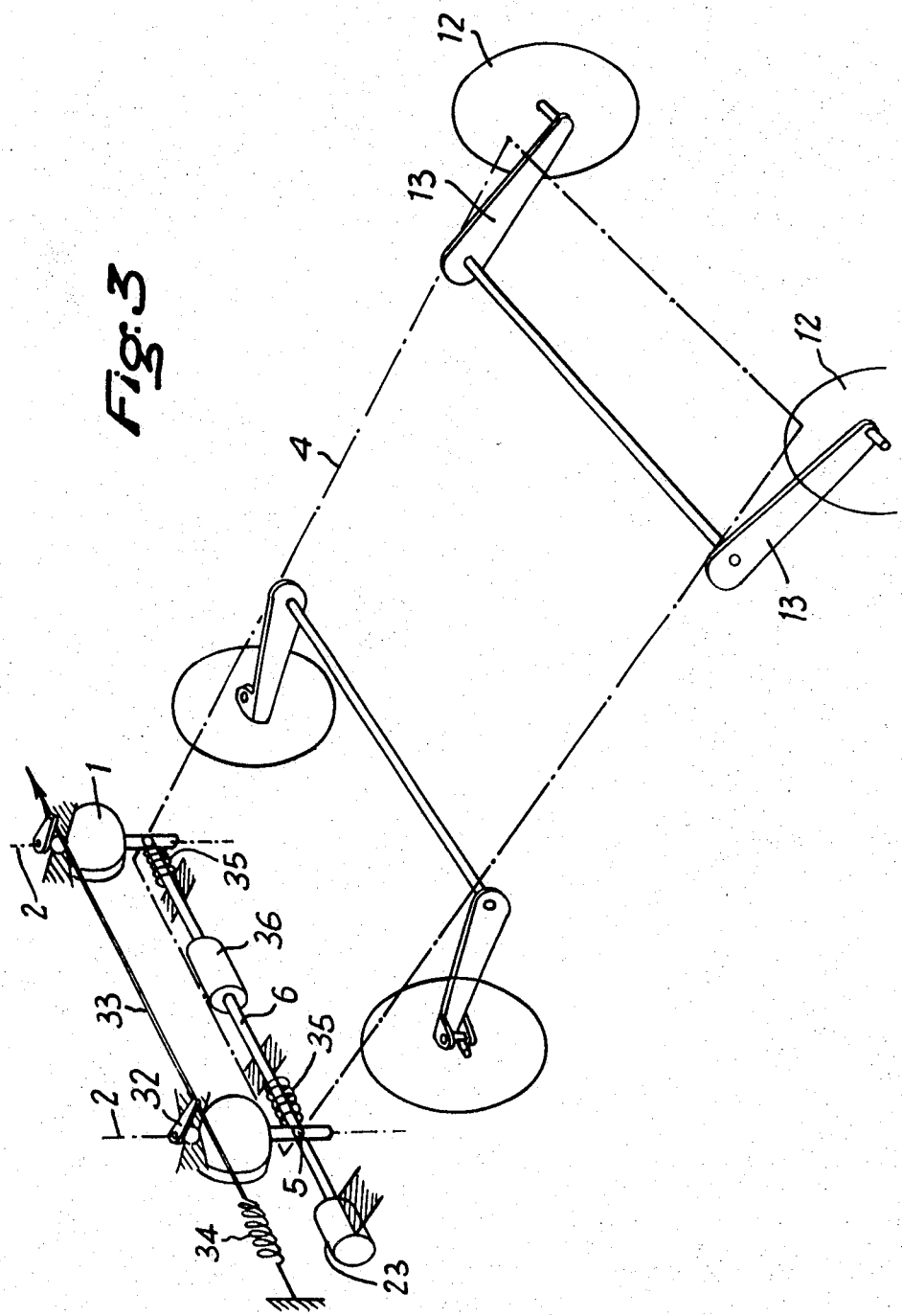

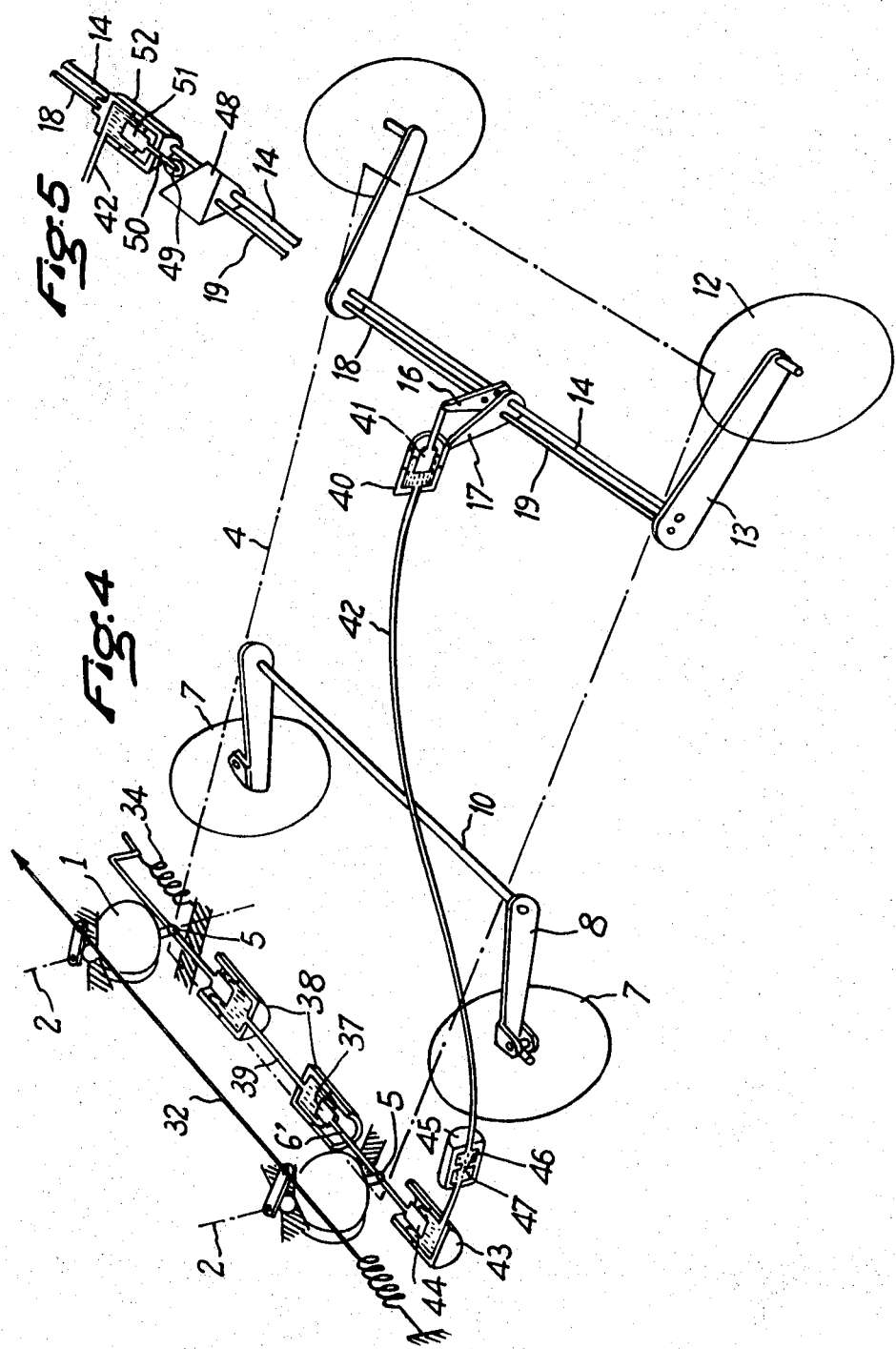

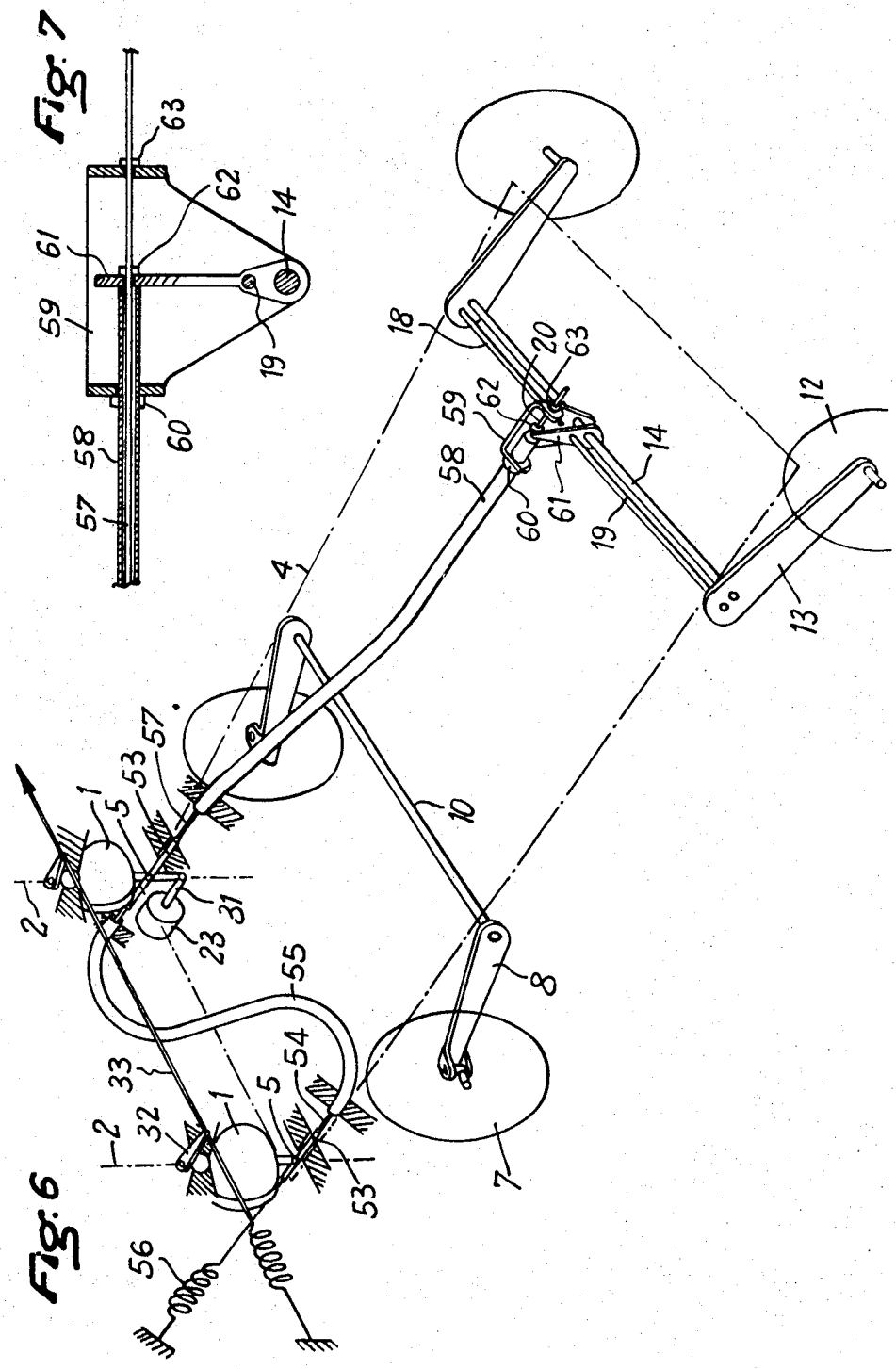

ROAD VEHICLE LIGHTING EQUIPMENT

BACKGROUND OF THE INVENTION

1. Field of the Invention

This invention relates to road vehicle-lighting equipment.

2. Summary of the Prior Art

When a road vehicle is travelling at low speed, using its low beam headlamps, the lighting is sufficiently spread for proper vision. When, on the other hand, a vehicle is travelling with its high-beam headlamps on, whether these be normal headlamps or supplemental "fog-lamps," the lighting is far more concentrated, while such concentrated illumination is fine on straight-away, it is often inadequate on bends.

Vehicles have been proposed in which the lamps are linked to the steering system so as to pivot with and in the same direction as the steerable road wheels.

In most of these suggested vehicles the pivot axis is vertical when the vehicle is stationary. On bends therefore, the pivot, being fixed to the vehicle body, tilts together with the body as the vehicle rolls under the effect of centrifugal force. The result is that the light beams are raised off the road surface To offset this raising of the beams, the pivot axis of each of the pivotal lamps may be includes forward in relation to the car body. This inclination of the pivot axis of the lamp lowers the light beam during a change of direction. The angle through which it is lowered by such an inclination, however, is substantially a parabolic function of the pivot angle of the lamp. Consequently, if the pivot axis of the lamps be inclined in the longitudinal plane by a fixed angle to offset the raising due to rolling in a turn taken at a specific speed there will be overcompensation if the same turn is taken at reduced speed conversely there will be undercompensation if the turn is taken at a higher speed. Again, if compensation is obtained for a given angle of roll and a given pivot inclination, it will no longer be correct for a different pivot angle, if the angle of roll remains the same.

A suggestion has already been made that the pivot axis of each lamp should be inclined in a transverse plane, outward towards the outsides of the vehicle.

This transverse inclination of the lamp axis results in dipping the beam from the lamp situated on the inside of the bend, the angle of dip varying practically linearly with the pivot angle of the lamp. Because of the rolling of the vehicle the pivot axis of the inside lamp is brought back to the vertical. When it reaches this vertical position, its beam is once more the road properly However, this solution results in raising of the beam from the outside lamp additional to the rise due to rolling.

To overcome this difficulty, it has been further suggested that the pivot axis of each of the lamps should be inclined both in a transverse and a longitudinal plane, so as to take advantage of the best features of both prior art systems to the best advantage.

In the design of such a combined system, the inclinations are set at maximum expected values. Thus a normally executed turn the beam projection distance will be reduced.

The object of the present invention is to provide a vehicle with pivotal headlamps, in which the projection distance of the lamp beams can be maintained substantially constant during changes of direction, whatever the speed of the vehicle and the radius of curvature.

SUMMARY OF THE INVENTION

According to the present invention there is provided in a road vehicle a pair of steerable road wheels, a steering system, a plurality of headlamps each mounted to pivot about an axis, means linking the lamps to the steering system whereby the lamps are caused to pivot as a function of any change in direction of the vehicle, and means responsive to the angle of roll of the vehicle and connected to the headlamps to vary the inclination of the pivot axis in such a manner as to maintain the orientation of the lamp beams substantially in a preset plane irrespective of the roll of the vehicle.

The means whereby the tilt of the pivot axis of the lamps is varied may be controlled, for example, by the relative turning of the two ends of an antiroll torsion bar. Alternatively, they may be operated by a weight capable of motion in a transverse direction in relation to the vehicle and subjected to a resiliently applied restoring force. The position of the weight varies with the transverse force applied to it; and, since this force is proportional to that exerted on the vehicle, the position of the weight is proportional to the angle of roll of the vehicle.

As mentioned previously, when the pivot axis of the lamps are inclined in a transverse plane, compensation for beam lift can be obtained, irrespective of the turning angle of the lamp, if the angle of inclination is equal to the angle of roll. Thus, the invention makes it possible to obtain compensation for lift, whatever the speed of the vehicle or the angle through which the road wheels are turned.

When the pivot axis of the lamps are tilted in a longitudinal vertical plane, on the other hand, the raising of the beam depends both on the roll of the vehicle and the turning angle of the lamp. Tilting the pivot axis according to the amount of roll will therefore not, in itself, provide compensation for beam lift irrespective of vehicle speed and angle of the road wheels.

Such compensation can nevertheless be obtained if the vehicle is also provided with equipment, responsive to the speed of the vehicle, for changing the inclination of the pivot axis of the lamps, so as to tilt the optical axis of the lamps forward when the speed rises and to tilt backward when the speed falls. The invention is provided with equipment which will perform such compensation whenever the steering wheel is turned.

BRIEF DESCRIPTION OF THE DRAWINGS

FIG. 1 is a perspective view of one embodiment of vehicle-lighting equipment in accordance with the invention;

FIG. 2 is a section of a detail, on the line II—II of FIG. 1;

FIGS. 3 and 4 are views similar to FIG. 1 of two other embodiments of the invention;

FIG. 5 is a perspective view of a detail of a modification of the first three embodiments;

FIG. 6 is a view similar to FIG. 1 of a fourth embodiment of the invention;

FIG. 7 is a section of a detail of the embodiment shown in FIG. 6;

As shown in FIG. 1, the vehicle has two headlamps 1. Each of the lamps 1 is fixed to a spindle 2, which lies in an axial plane of the lamp and is substantially at right angles to the optical axis of the lamp. The top end portion of the spindle 2 is carried by a ball-and-socket joint 3, in the chassis or other structure 4 of the vehicle. The bottom end portion of the spindle 2 is joined by another ball socket joint 5, to a horizontal rod 6, which lies in substantially the same vertical plane as the joints 3 and can slide, in relation to the chassis 4, in a direction at right angles to the fore-and-aft line of the vehicle. This rod 6 is connected to both of the ball joints 5.

Figure 8:
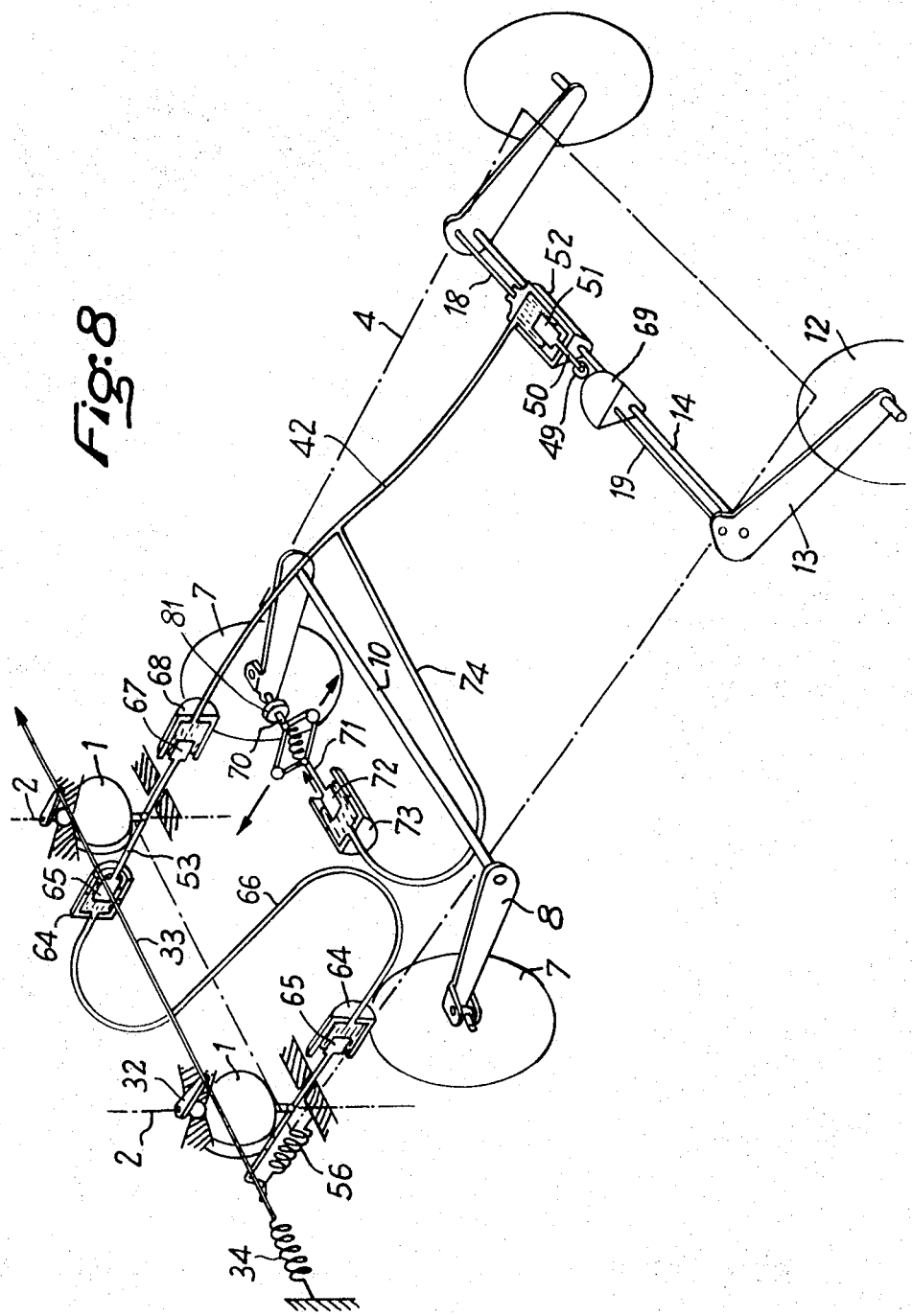
FIG. 8 is a view similar to FIG. 1 of a fifth embodiment of the invention.

The vehicle's front wheels 7 are mounted on the ends of arms 8 fixed to and secured against rotation in relation to an antiroll torsion bar 10. The torsion bar is free to turn in brackets 11, which is carried by the chassis or other structure 4.

Similarly, the vehicle rear wheels 12 are mounted on the ends of arms 13, fixed to, and secured against rotation in relation to, an antiroll torsion bar 14, which is free to turn in brackets 15 carried by the chassis 4.

Pivoted about the midportion of the torsion bar 14 are two arms 16 and 17, connected, each to its adjacent arm 13, by rods 18.

A cable 20 connects the arm 16 to the rod 6. This cable passes through a sheath 21, one end of which is fixed to the arm 17 and the other fixed to the chassis or other structure 4. Motion proportional to the amount of roll is thus imparted to the rod 6 in one direction or the other, according to the direction of roll. The imparted motion is such that the pivot axis 2 are substantially vertical when there is no roll and the vehicle is horizontal. The rod 6 is biased by a restoring spring 22.

A damping device 23 acts on the rod 6 through a lug 24 and prevents the rapid and irregular oscillation of the frame 4 about its center of roll. Such oscillations could be caused by irregular road surface and would result in undue movement of the headlamps.

The damper 23 may consist, as shown in FIG. 2, of a body 25 fixed to the chassis or other vehicle structure 4. This body 25 forms two chambers 26 and 27, each closed by a diaphragm 28 and 29 respectively, intercommunication between the chambers being provided by a constructed passage 30. The center of the diaphragm 28 is fixed to a rod 31, connected to the lug 24.

In addition, a short link rod 32, is keyed to each of the spindles 2. The free ends of these link rods 32 are articulated to a single rod 33, which is linked to the steering rod system and subjected to the action of a restoring spring 34.

The means of linking the rod 33 to the steering rod system is immaterial, but it should preferably be such that some conventional mechanism ensures that the pivot angle of the lamps 1 about their spindles 2 is larger than the angle through which the road wheels are turned at the commencement and that this pivot angle increases more rapidly at the commencement that at the end of the change of direction of the road wheels. In the example shown in FIG. 1, the rod 33 is connected by a cable 75, extending in a sheath 76, to a steering repeater lever 77 on the same side as the cable. This lever 77, mounted so as to pivot about the pin 78 relatively to the chassis 4, is connected by conventional means through a rod 79 to the steering rack 80 of the vehicle.

It will be apparent from the foregoing description that the lamps 1 pivot with the road wheels 7, but that their spindles 2, which are at right angles to the general plane of the chassis in the absence of roll, become tilted transversely according to the magnitude of the roll. Such tilting is towards the inside of the wood bend. As the vehicle rolls outward, the inward tilt compensates and results in the lamp pivot axis remaining.

In the embodiment of FIG. 3, the rod 6 is kept central by two springs 35 and carries a weight 36. In which such a position the lamp spindles 2 are vertical, and carries a weight 36.

On a bend, the centrifugal force causing the chassis 4 to make a rolling movement acts similarly to produce a related movement of the weight 36. This results, as in the previous embodiments in the tilting of pivot axis 2 to compensate for the degree of roll.

In the embodiment shown in FIG. 4, the rod 6 has been replaced by two half-rods 6'each of which is connected by a ball joint 5, to one of the spindles 2 and which are hydraulically interconnected. For this purpose, each half-rod 6' is secured to a piston 37 slidable within a cylinder 38 fixed to the chassis or other vehicle structure 4. The two cylinders communicating through a pipe 39.

In addition, the rod assembly 6' is likewise hydraulically connected to the arms 16 and 17. The arm 17 carries a cylinder 40 in which slides a piston 41 yoked to the arm 16. This cylinder 40 communicates through the pipe 42 to another cylinder 43 fixed to the frame. A piston 44 is fixed to rod 6' which is slidable in this second cylinder. A damper consisting of a cylinder 45, incorporating a partition 46, which contains an aperture 47, is interposed in the pipe line 42.

To enable a fixed basis to be established for obtaining the desired variation in the transverse tilting of the axis 2 according to the magnitude of the roll, it is possible, as illustrated in FIG. 5, to fix to the free end of the rod 19 a cam 48, so mounted as to pivot about the antiroll bar 14. This cam 48 acts in conjunction with a roller 49, carried by a rod 50 fixed to a piston 51. This piston slides within a cylinder 52, which is fixed to the rod 18 and arranged to pivot about the antiroll bar 14. The cylinder 52 communicates with the pipe line 42.

During a roll, the roller 49 moves on the cam 48, so that the piston 51 is caused to move within the cylinder 52, thereby causing the lamp spindles 2 to tilt to an extent controlled by the shape of the cam 48.

In the embodiment of FIG. 6, the spindles 2 of the lamps 1 can be tilted not transversely, but longitudinally.

Each of the ball joints 5 connects the corresponding spindle 2 to a horizontal rod 53, which has freedom to slide in relation to the chassis, parallel to the fore-and-aft line of the vehicle. The two rods 53 are interconnected by a cable 54, which extends within a sheath 55. One of the rods 53 is subject to the action of a restoring spring 56, and the rod 31 of the damper 23 acts on one of the spindles 2 so as to brake the longitudinal tilting movement of these spindles.

One of the rods 53 is fixed to one end of a cable 57, movable within a sheath, 58. The other end of this sheath passes through a guide aperture in a member 59, which is mounted so as to pivot about the torsion bar 14 and is fixed to the rod 18. The sheath bears both against the outside of the member 59, with the aid of a stop 60, and against an arm 61, which likewise pivots about the torsion bar 14 and to which the rod 19 is fixed. As for the cable 57 itself, this has one stop 62, which bears against the arm 61, so that this arm lies between the sheath 58 and the stop 62, and another stop 63, which bears against the outside of the member 59. (FIG. 7).

In the position shown in FIG. 7, which corresponds to the no-roll condition, the optical axis of the lamps 1 are substantially and for horizontal. If, during a roll the arm 61 pivots clockwise in relation to the member 59, arm carries the stop 62 along with it. The cable 57 moves from left to right in relation to its sheath 58 which is immobilized by the stop 60. This results in the lamps 1 being tilted forward. Should the relative motion between the arm 61 and the member 59 be in the opposite direction, the member 59 will carry the stop 63 along with it. Will then the cable 57 move from left-to-right in relation to its sheath 58, which is immobilized by the arm 61. This again will result in the lamps 1 being tilted forward.

In this way, the lamps 1 have their optical axis tilted forward whenever rolling occurs, irrespective of the turning direction.

In the embodiment illustrated in FIG. 8, the linkage between the two rods 53 is hydraulic. Each of these rods is fixed to a piston 65, slidable within a cylinder 64. The two cylinders 64 communicate with each other through a pipe 66. The action of the spring 56 is to tilt the spindles 2 in the direction corresponding to the lowering of the optical axis of the lamps 1.

The movement of the rods 53 is also hydraulically controlled. One of these rods is fixed to a piston 67, which slides within a cylinder 68. This cylinder 68 communicates through the pipe 42 with the cylinder 52 provided in the embodiment shown in FIG. 5, but the cam 48 is replaced by a cam 69. The cam 69 has a symmetrically shaped control face, the roller 49 being at the point of symmetry of the cam in the absence of rolling. When a roll occurs, the optical axis of the lamps 1 are tilted forward by the spring 56 to an extent proportional to the magnitude of the roll and determined by the shape of the cam 69.

In addition, means are provided for correcting the longitudinal tilting of the spindles 2 in accordance with the speed of the vehicle during any change in the direction of steering. One of the rod wheels 7 is engaged through a clutch 81, with the shaft 70 of a centrifugal governor, of which that member 71, which has axial motion is connected to the piston 72. This piston runs within the cylinder 73 fixed to the chassis or other structure 4 and communicates through the pipe 74 with the pipe 42.

The clutch 81 is operated by the turning of the rod wheels, so that the shaft 70 is not driven once the wheels have been straightened.

Figure 9:
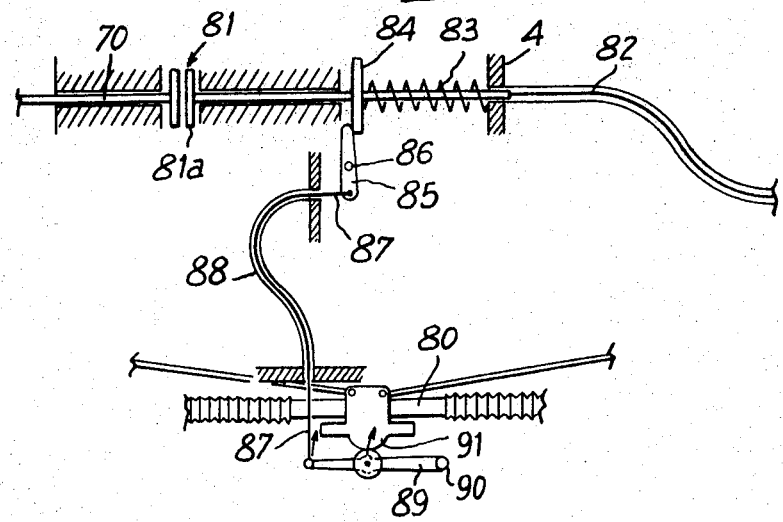
FIG. 9 shows a detail of the embodiment of FIG. 8.

In FIG. 9, the moving of plate 81a of the clutch, which is connected by the cable 82 to the adjacent road wheel 7, is urged towards its engaged position by the spring 83 inserted between the chassis or other structure 4 and the disc 84 fixed to the plate 81a. Bearing against this disc is one end of a lever 85, pivoted at 86 on the chassis or other structure. The other end of this lever is connected by a cable 87, which runs in its sheath 88 to a lever 89, pivoted on the chassis 4 at 90 and held by the spring 83 against a central boss 91, on the rack 80.

With the wheels straight, the lever 85 holds the plate 81a out of action through the agency of the disc 84.

When the vehicle is steered into a curve, the boss 91 releases the lever 89, which turns about its fulcrum and in turn releases the plate 81a, whereupon the shaft 70 is driven.

Should the speed then rise, the piston 72 moves in the cylinder 73 and the optical axis of the lamps 1 are tilted forward.

Figure 10:
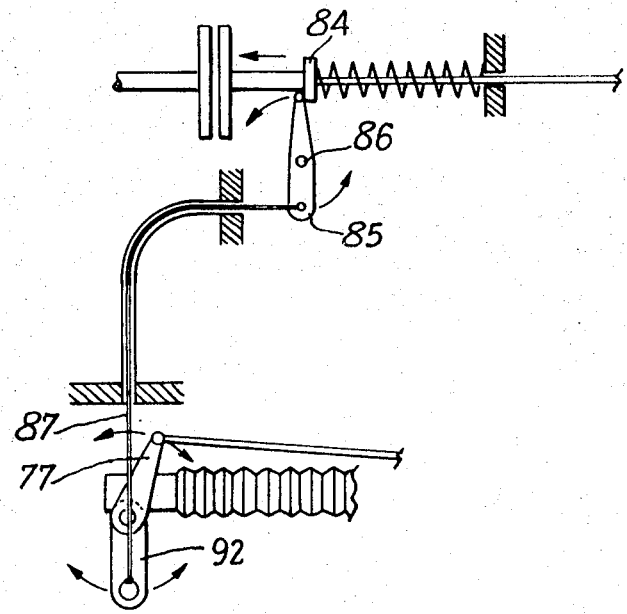
FIG. 10 shows a modification of the equipment shown in FIG. 8.

In the modification of FIG. 10, the cable 87 is fixed to a lever 92, rigidly connected to the steering repeater lever 77, which acts through the cable 87 to release the disc 84 when the wheels are turned to left or right.

It should be emphasized that the invention should not be regarded as limited to the practical examples described and illustrated, but includes, on the contrary, all modifications thereof within the scope and spirit of the appended claims.

I claim:

1. In a road vehicle
   a. at least one steerable road wheel
   b. a steering system that includes said wheel
   c. a plurality of headlamps
   d. means for mounting each headlamp to pivot about an axis which changes inclination in response to the angle of roll of the vehicle
   e. means responsive to the steering system for causing the headlamps to pivot upon change in direction of the vehicle
   f. means responsive to the angle of roll of the vehicle for varying the inclination of said axis to maintaining orientation of the headlamp beams substantially in a preset plane irrespective of the roll of the vehicle.

2. A vehicle according to claim 1, which includes means for moving the pivot axis of each lamp in a plane extending longitudinally of the vehicle, said vehicle further comprising means responsive to the speed of the vehicle, for changing the inclination of the pivot axis of the lamps, so as to tilt the optical axis of the latter forward when the speed rises and to raise them when the speed falls.

3. A vehicle according to claim 2, incorporating means for rendering the means responsive to the speed of the vehicle inoperative when the vehicle is being steered straight ahead.

4. A vehicle according to claim 1, which includes means for moving the pivot axis of each of the lamps in the same plane extending transversely of the vehicle.

5. A vehicle according to claim 1, in which the means responsive to the angle of roll of the vehicle includes a damper for braking the tilting movement of the pivot axis of the lamps.

6. A vehicle according to claim 1, in which the means responsive to the roll of the vehicle includes a cable transmission coupling one of the lamp pivot axis to roll responsive means.

7. A vehicle according to claim 1, in which the means responsive to the roll of the vehicle includes a hydraulic transmission coupling one of the lamp pivot axis to roll responsive means.

8. A vehicle according to claim 1, in which the means responsive to the roll of the vehicle includes two components each of which is rigidly connected to, and secured against turning in relation to, one end of the antiroll bar one of said components consists of
   a cam,
   the other component consisting of
   an assembly which comprises
   a cylinder
   a piston sliding within said cylinder,
   a piston rod
   and
   a roller carried by the piston rod and acting in conjunction with the cam.

9. A structure as specified in claim 1 in which said means responsive to the angle of roll of the vehicle includes a mass mounted in position to move freely in transverse direction relative to the longitudinal axis of the vehicle in response to the roll of the vehicle and means for restoring said mass to said position.

10. A structure as specified in claim 1 which includes means for positioning the pivot axis of each headlamp substantially vertical in the absence of roll and at an incline to slope inwardly from bottom to top towards the inside of a turn to the extent determined by the degree of roll.

11. A structure as specified in claim 1 which includes means for moving at least one part of the pivot of each headlamp in longitudinal direction relative to the vehicle to incline the axis backwards from bottom to the top in the absence of roll and forward from bottom to top to the extent determined by the roll of the vehicle.

12. A structure as specified in claim 1 in which the means for mounting each headlamp is a movable spindle which comprises the pivot axis of the lamp and in which the means responsive to the angle of roll of the vehicle includes a cable transmission interconnecting the axis spindles of the headlamps.

13. A structure as specified in claim 1 in which the means for mounting each headlamp is a movable spindle which comprises the pivot axis of the lamp and in which the means responsive to the angle of roll of the vehicle includes a hydraulic transmission interconnecting the axis spindles of the headlamps.

14. In a road vehicle, a pair of steerable road wheels, a steering system, a plurality of headlamps to the steering system whereby the lamps are caused to pivot as a function of any change in direction of the vehicle, and means responsive to the angle of roll of the vehicle and connected to the headlamps to vary the inclination of the pivot axis in such manner as to maintain the orientation of the lamp beams substantially in a preset plane irrespective of the roll of the vehicle, an antiroll bar, and said roll-responsive means includes a pair of arms each of which is rigidly connected to, and secured against turning in relation to the antiroll bar in such a way that the angular distance between the two components varies with the angle of roll.